United States Patent [19]
Blossey et al.

[11] 4,199,766
[45] Apr. 22, 1980

[54] RANDOM-DUMP STORAGE BUFFER FOR MOVING WEB

[75] Inventors: Daniel F. Blossey, Rochester; Narayan V. Deshpande, Penfield; Eugene C. Faucz, Webster; Klaus K. Stange; Stanley B. Swackhamer, both of Pittsford, all of N.Y.

[73] Assignee: Xerox Corporation, Stamford, Conn.

[21] Appl. No.: 772,703

[22] Filed: Feb. 28, 1977

[51] Int. Cl.² ............ G01D 15/12; G11B 15/56
[52] U.S. Cl. ................. 346/74.1; 226/97; 226/118
[58] Field of Search ............ 226/118, 119, 97; 346/74.1

[56] References Cited

U.S. PATENT DOCUMENTS

| | | | |
|---|---|---|---|
| 3,495,268 | 2/1970 | Hurst | 226/97 X |
| 3,528,593 | 9/1970 | Armstrong | 226/118 X |
| 3,965,478 | 6/1976 | Schloemann | 346/74.1 |
| 3,987,491 | 10/1976 | Nelson | 346/74.1 |

Primary Examiner—Richard A. Schacher
Attorney, Agent, or Firm—Michael H. Shanahan

[57] ABSTRACT

A storage buffer for a moving web comprises a collection bin having an opening through which the web can be randomly dumped under the influence of gravity; means for floating randomly dumped web within the collection bin upon a cushion of gas without mechanical support of said web; a web exit within a wall of said collection bin; and means for guiding pressurized gas over web passing through the web exit.

4 Claims, 3 Drawing Figures

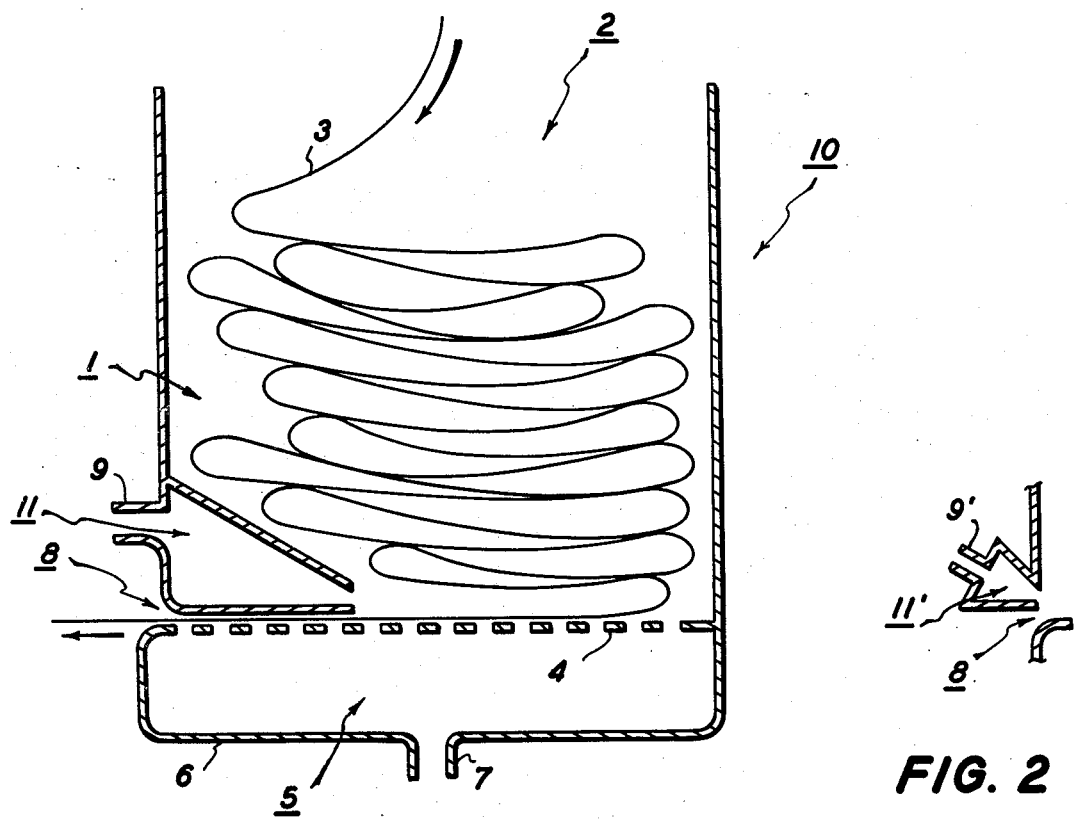
FIG. 1
FIG. 2
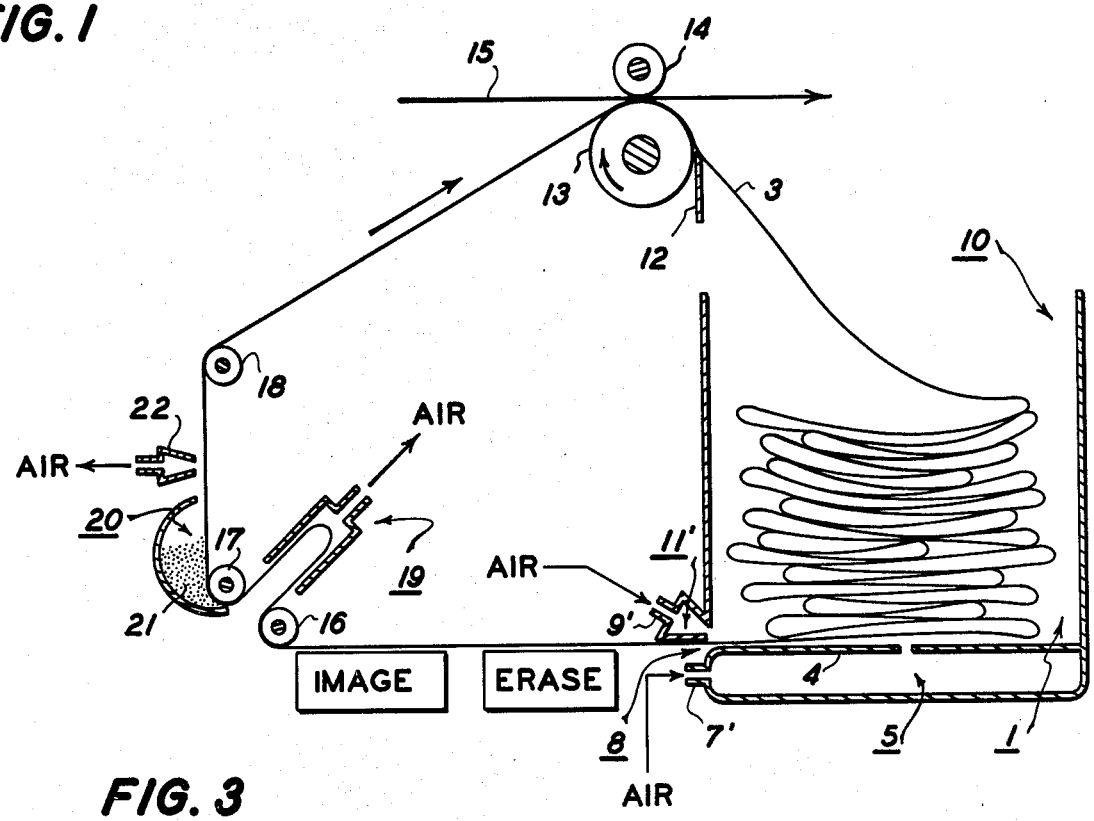
FIG. 3

RANDOM-DUMP STORAGE BUFFER FOR MOVING WEB

BACKGROUND OF THE INVENTION

This invention relates to the handling of webs of material; and more particularly, to devices within which moving webs are temporarily collected and stored during their path of travel.

In many web handling systems, it is often desirable to have a length of web greater than the travel path of the web. For example, in imaging systems, it is often desirable to have a short travel path for a web of imaging material upon which a latent image is created. This short travel path is often times desirable in order to achieve compactness of machine design. However, at the same time, it is often times desirable to have a long web of imaging material so that optional, convenience functions can be performed by the machine. For example, in imaging systems utilizing a web of imaging material, an original document to be copied can be pre-collated with a long web of imaging material by sequentially imaging each of the original pages onto the long web of imaging material prior to printing copies of the original document. This is particularly desirable in high speed printing systems wherein a master is latently recorded on the web of material at one station and subsequently transferred to a printing engine which runs the web of imaging material at high speeds through developer stations where graphic marking material is used to develop the latent image on the master and then through a transfer station where the graphic marking material is transferred from the master to a receiving member, such as paper, whereby copies are made.

In other industries, such as Textiles and Plastics, long webs of material are typically processed through a process travel path which is shorter than the length of the web of material.

One solution for providing temporary collection and storage of a web of material is a storage bin such as that shown in FIG. 15.4 "Magnetic Materials and Their Applications" by Ink C. Heck, published by Crane Russak and Company, New York, 1974. The device shown therein is a simple box like structure used in the tape-loop recorder to Bell Telephone Manufacturing Company, Ltd. A magnetic tape much greater in length than the travel path through the recorder is temporarily stored and collected, during recording, in the box-like structure. The recorded tape is allowed to randomly fall through the top opening of the box and tape to be recorded is pulled out of the same top opening of the box. By drawing tape from the same opening in the top, the behavior of the temporarily collected and stored web of magnetic tape undergoes undesirable activity. For example, the randomly dumped tape undergoes a "first in"—"first out" movement which assures that the bottom most fold of web is pulled up through the other layers of web fold creating a tumbling and mixing action of the temporarily collected and stored tape. One disadvantage of this tumbling and mixing action is that the collection bin must be made sufficiently large to accommodate the increased space occupied by the tumbling and mixing of the tape. Another disadvantage is the possibility of creasing and damaging the tape by this mixing and tumbling action.

Storage buffer utilizing compressed air in addition to mechanical aids for collecting moving web are known in U.S. Pat. Nos. 3,528,593 and 2,808,259. Both the tape entry and exit is from the top of the storage buffer and mechanical aids are used to avoid tumbling and mixing of the tape as it is withdrawn from the top.

U.S. Pat. No. 3,514,024 discloses the use of forced air on each side of the bottom most layer of web and to separate the lower most layer of web from the next higher layer of web in a collection bin. However, an end wall segment is utilized for supporting the moving web.

The present invention utilizes only pressurized gas or air without the aid of mechanical members to support and guide, without friction, a moving web. The entire bulk of collected and stored web is floated within the collection bin and web passing through the exit is separated from the adjacent layer of tape by pressurized gas or air.

SUMMARY OF THE INVENTION

It is, therefore, an object of the invention to overcome the above noted deficiences.

It is another object of this invention to provide a novel storage buffer for a moving web.

It is a further object of this invention to impart pre-collation capability to imaging systems utilizing a moving web of length greater than the travel path of the web through the system.

The foregoing objects and others are accomplished in accordance with the practice of the present invention by a storage buffer for a moving web, comprising a collection bin having an opening through which said web can be randomly dumped under the influence of gravity; means for floating randomly dumped web within the collection bin upon a cushion of gas without mechanical support for the web; a web exit within a wall of the collection bin; and means for guiding pressurized gas over tape passing through said web exit.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein:

FIG. 1 is a schematic illustration of an embodiment of the storage buffer of the present invention.

FIG. 2 is a schematic illustration of a variation of the storage buffer in the region of the web exit.

FIG. 3 is a schematic illustration of a magnetic imaging system utilizing the storage buffer of the present invention.

DESCRIPTION OF THE PREFERRED EMBODIMENTS

Referring now to FIG. 1, the storage buffer for a moving web is generally designated 10 comprising a collection bin 1 having an opening 2 through which a moving web 3 is randomly dumped under the influence of gravity. The storage buffer is provided with means for floating the randomly dumped web 3 within the collection bin 1 upon a cushion of gas by a perforated plate 4 in the lower most portion of the storage buffer so as to define a cavity 5 between storage plate 4 and the bottom wall 6 of the storage buffer. A gas inlet 7 is provided on the bottom wall 6 of the storage buffer to permit the entry of pressurized gas or air into cavity 5.

Moving web 3 exits the collection bin through web exit 8 within a wall of the collection bin. Pressurized gas or air inlet 9 communicates with nozzle 11 and constitutes means for guiding pressurized gas over moving tape 3 passing through web exit 8.

The flow of pressurized gas or air through inlets 7 and 9 are adjusted so that the pressurized gas passing through cavity 5 and perforated plate 4 is sufficient to float the randomly dumped moving web 3 contained in the collection bin; and, the pressurized gas or air passing through nozzle 11 is sufficient to separate the layer of web passing through the web exit from the next, higher fold of web. For example, when moving web 3 is commercially available magnetic tape of about 4 inches in width, a typical range of pressure for pressurized gas through nozzle 11 is from about 1 to about 4 inches of water. When the size of the collection bin is sufficient to hold about 200 feet of about 1.5 mil thick commercially available magnetic tape, pressurized gas at about 4 inches of water into inlet 7 of cavity 5 is sufficient to float the collected tape; and, pressurized gas at about 3 inches of water through inlet 9 and nozzle 11 is also sufficient to separate the layer of web passing through web exit 8 from the next, higher layer of web. Higher pressures can be employed satisfactorily in the practice of the present invention. Generally speaking, pressures greater than those required to accomplish the functions of floatation and separation for any given length and thickness of magnetic tape, generally requires a larger collection bin due to the tendency of the magnetic tape to become fluffed by the pressurized gas. With the aforementioned 200 feet of web of commercially available 1.5 mil thick magnetic tape, and with pressurized air at about 3 inches of water pressure into inlets 7 and 9, the force required to pull moving web 3 through web exit 8 is less than 100 grams.

A modification to the storage buffer is shown in FIG. 2 around the web exit 8. In this embodiment, the nozzle 11 constituting means for guiding pressurized gas over the web passing through web exit 8 is located exterior to the collection bin. It will be appreciated that web exit 8 and nozzle 11 are of substantially the same width in the preferred embodiment of the invention; however, nozzle 11 may be of any shape and width effective to perform the function of separating the layer of web exiting through web exit 8 from the next, higher layer of web material.

Numerous advantages are provided by the storage buffer of the present invention. The pressurized gas or air floatation of the collected moving web in the collection bin allows for drawing the web from the bottom of the collection bin without friction by effectively removing the weight of the upper layers of the collected web. Drawing from the bottom of the collection bin removes the tumbling and mixing action involved when pulling the randomly dumped and collected tape up through the other layers from the top of the collection bin. This bottom draw eliminates the possible creasing or damaging of the tape due to the tumbling action especially at the higher tape speeds. Bottom draw also allows for a smaller physical size; no allowance in size of the collection bin is necessary for the tumbling or mixing action associated with top draw. Nozzle or air knife 11 at the web exit 8 keeps the tape loops separated near the exit 8 and provides a cushion of air over the exiting tape in addition to the cushion of air provided by pressurized gas passing through perforated plate 4. The action of nozzle or air knife 11 eliminates the possibility of pulling out more than one loop of collected web through the exit opening. The combination of these effects provide a very smooth, almost frictionless, tape storage buffer capable of very high speeds. The effect of tape width and weight is virtually eliminated.

Referring now to FIG. 3, there is seen a schematic illustration of a magnetic imaging system utilizing the storage buffer of the present invention. Therein is shown a magnetic print engine which with the addition of the optional erase and image stations indicated within the boxes can optionally form a complete magnetic imaging system. In FIG. 3, like numerals referred to like components described in conjunction with FIGS. 1 and 2. With respect to the complete print engine only, a previously imaged web 3 of magnetic tape is taken from a recording or imaging engine to the print engine shown in FIG. 3 and inserted along its travel path with the excess length of web 3 placed in collection bin 1 of storage buffer 10. As shown in FIG. 3, transfer rollers 13 and 14 engage web 3 of magnetic tape and receiving member 15 (such as paper, etc.) and sandwiches them in the nip formed between rollers 13 and 14. Web 3 is therefore driven at the location of the pressure nip between transfer rollers 13 and 14. To avoid tracking problems, tension means 19 is provided so that the resulting tension created in web 3 allows web 3 to track through the pressure nip. Tension means 19 can comprise any conventional tension means and is illustrated in FIG. 3 as a vacuum column. The use of a vacuum column is preferred because it has shown to be an excellent edge guide for web 3 in addition to its function as a tensioning device. A relatively small tension from about 0.15 pounds per inch to about 0.5 pounds per inch of tape width gives satisfactory results. Nip loading appears to have no effect on the tape tension; however, in addition to the tension, the wrap angle of web 3 prior to the nip should be carefully adjusted to obtain good operation. A wrap angle from about 90 degrees to about 120 degrees provides good operation. It has also been found that in printing systems where the web 3 of magnetic tape is not to be driven by a pressure nip, for example, such as when the tape is edge driven at a roller such as vacuum capstan roller 16, there was no tension in any portion of the tape and no tape tracking problems were experienced in handling the tape at speeds as high as 70 inches per second. Rollers 17 and 18 are idler rollers. Higher speeds were not utilized due to the speed limitations of the motor employed. However, it is expected that the storage buffer of the present invention will exhibit no tape tracking problems in edge driven embodiments when higher speeds are utilized.

Web 3 of magnetic tape is pulled through web exit 8, tensioned by tensioning means 19 such as the vacuum column shown, passed through the developer station 20 wherein latent magnetic images on web 3 are developed by magnetic toner 21, passes by vacuum nozzle 22 which removes excessive magnetic toner from background portions of the latent magnetic image on web 3, and passes through the pressure nip of transfer rollers 13 and 14 whereby magnetic toner material 21 residing on web 3 of magnetic tape is pressure transferred onto paper 15 to form a visible image thereon corresponding to the latent magnetic image on web 3.

To provide a complete imaging system, the addition of an erase station and an imaging station to the print engine of FIG. 3 is made. The various stations, including the optional erase and image station shown in FIG. 3 are known in the art. These conventional stations can be employed. Furthermore, storage buffer 10 can be inserted in either the magnetic print engine or the magnetic imaging system anywhere along the path of travel of web 3 of magnetic tape and inbetween any two stations. However, for machine cleanliness and convenience of web handling, it is preferred to have storage buffer 10 located along the path of travel of web 3 at a location where web 3 is substantially free of magnetic toner. The order of stations, including the optional erase and image stations, noted in FIG. 3 constitutes the typical order of stations in a complete magnetic imaging system in which the latently imaged member is continuously recycled through its travel path. Thus, creation of the latent image at the image station occurs prior to development, development occurs prior to transfer of the visible image to a receiving member, and transfer of the visible image to a receiving member occurs prior to erasure of the latent image on web 3, and erasure of the latent image on web 3 occurs prior to creating another latent image on web 3.

As previously mentioned, the stations shown in FIG. 3, including the optional erase and image stations, are conventional in the art. These stations are found in U.S. Pat. Nos. 3,555,556 and 3,555,557 (thermomagnetic recording); 3,787,877 (improved magnetic recording member, erase station, development station, cleanup station, and transfer station). In addition to thermomagnetic recording, direct magnetic recording such as that shown in U.S. Pat. No. 3,161,544 or U.S. Pat. No. 3,254,626 can be employed. All of the aforementioned patents are hereby expressly incorporated by reference.

It will be appreciated that other variations and modifications will occur to those skilled in the art upon a reading of the present disclosure. These are intended to be within the scope of this invention. For example, in imaging systems utilizing a web greater in length than its path of travel and where, owing to the imaging system employed, such as, for example, the chemical sensitivity of the web to any particular environment, it may be desired to utilize a pressurized gas which is inert with respect to the chemical sensitivity of the web. Accordingly, the phrase "gas" is used herein to refer to all materials in the state of matter commonly referred to as the gaseous state. In most applications for the storage buffer from the present invention, pressurized gas can be employed. However, the term pressurized "gas" is employed herein to indicate the scope of applicability of the present invention to all web handling systems.

What is claimed is:

1. Magnetic printing apparatus comprising
a continuous web of flexible magnetic tape capable of retaining a plurality of latent magnetic images thereon in a pre-collated form,
transport means for moving at a substantially constant speed the continuous web over a path less than the length of the tape,
developing means for depositing graphic material on the web to develop the latent magnetic images into visible graphic material images,
transfer means for transferring graphic material images from the web to a receiving member,
web tensioning means for exerting a tension in the moving web to assist tracking of the web on the transport means and
a storage buffer for temporarily storing that portion of excess web longer than the transport path including a collection bin having a top opening for collecting the excess web with the aid of gravity into layers of folds created by randomly dumping the moving web into the collection bins, said bin having a bottom opening in a wall of the bin near the floor of the bin for exiting the moving web back into its path of travel, floatation means adjacent the bin floor for directing a pressurized gas against the bottom layer of web adjacent the floor to support the folded web in the bin above the floor without other mechanical support and nozzle means adjacent the bottom opening and above the web exiting the bin for directing pressurized gas into the bin to maintain the shape of the bottom fold within the bin as the web exits the bin to enable the floatation means to support the folded web.

2. The apparatus of claim 1 wherein the nozzle means is located in the interior of the bin.

3. The apparatus of claim 1 wherein the nozzle means is located at the bottom opening in the bin for the exiting web.

4. The apparatus of claim 1 wherein the web tension means includes a vacuum column.

* * * * *